US009680700B2

(12) United States Patent
Ivanov et al.

(10) Patent No.: US 9,680,700 B2
(45) Date of Patent: Jun. 13, 2017

(54) DEVICE, SYSTEM AND METHOD OF CONFIGURING A RADIO TRANSCEIVER

(71) Applicant: Intel Corporation, Santa Clara, CA (US)

(72) Inventors: Vladimir Ivanov, St. Petersburg (RU); Markus Dominik Mueck, Unterhaching (DE); Hossein Alavi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,307

(22) PCT Filed: Sep. 8, 2013

(86) PCT No.: PCT/US2013/058654
§ 371 (c)(1),
(2) Date: Dec. 26, 2013

(87) PCT Pub. No.: WO2015/034526
PCT Pub. Date: Mar. 12, 2015

(65) Prior Publication Data
US 2015/0207680 A1 Jul. 23, 2015

(51) Int. Cl.
*H04L 12/24* (2006.01)
*G06F 9/445* (2006.01)
(Continued)

(52) U.S. Cl.
CPC ...... *H04L 41/0813* (2013.01); *G06F 9/44505* (2013.01); *H04B 1/40* (2013.01); *H04W 88/06* (2013.01)

(58) Field of Classification Search
CPC combination set(s) only.
See application file for complete search history.

(56) References Cited

U.S. PATENT DOCUMENTS

| 8,505,029 B1 | 8/2013 | Chanda et al. |
| 2006/0085646 A1* | 4/2006 | Cutter, Jr. ............... G06F 21/10 713/175 |

(Continued)

FOREIGN PATENT DOCUMENTS

| WO | 2012086993 | 6/2012 |
| WO | 2013085541 | 6/2013 |

OTHER PUBLICATIONS

ETSI TS 103 095 V1.1.1 (Jan. 2013) Technical Specification.*
(Continued)

*Primary Examiner* — Ankur Jain
*Assistant Examiner* — Zhitong Chen
(74) *Attorney, Agent, or Firm* — Shichrur & Co.

(57) ABSTRACT

Some demonstrative embodiments include devices, systems and/or methods of configuring a radio transceiver. For example, some embodiment include a radio virtual machine (RVM) to configure a radio transceiver, the RVM including a radio processor to execute a first code configuring one or more transceiver functionalities independent of a configuration of the radio transceiver, and to generate a second code based on the configuration of the radio transceiver and the first code, wherein the second code is to be executed by the radio transceiver to configure the one or more transceiver functionalities for the radio transceiver.

26 Claims, 9 Drawing Sheets

(51) Int. Cl.
　　　H04B 1/40　　　(2015.01)
　　　H04W 88/06　　(2009.01)

(56) References Cited

U.S. PATENT DOCUMENTS

| | | | |
|---|---|---|---|
| 2008/0137548 A1 | 6/2008 | Hassan et al. | |
| 2009/0156129 A1* | 6/2009 | Hassan | G06F 9/5044 455/66.1 |
| 2009/0319793 A1 | 12/2009 | Zic et al. | |
| 2011/0047539 A1 | 2/2011 | Reunamaki et al. | |
| 2011/0205984 A1 | 8/2011 | Lee et al. | |
| 2012/0182121 A1* | 7/2012 | Mueck | H04W 8/22 340/5.2 |
| 2013/0243055 A1* | 9/2013 | Choi | H04B 1/0003 375/222 |

OTHER PUBLICATIONS

ETSI TS 10 095 V1.1.1 (Jan. 2013).*
IEEE Std 802.111™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wireless Gigabit Alliance (WGA) Specifications; WiGig MAC and PHY Specification Version 1.1, Apr. 2011—Final Specification; 442 pages.
Wi-Fi Alliance Technical Committee P2P Task Group; Wi-Fi Peer-to-Peer (P2P) Technical Specification; Version 1.2; Dec. 14, 2011; 160 pages.
ETSI TS 103 095 V1.1.1 (Jan. 2013), Reconfigurable Radio Systems (RRS); Radio Reconfiguration related Architecture for Mobile Devices, 29 pages.
Kees Van Berkel et al., Multi-Radio Scheduling and Resource Sharing on a Software Defined Radio Computing Platform, Proceedings of the SDR '09 Technical Conference and Product Exposition, SDR Forum, 2009, 6 pages.
Wireless Innovation Forum, Wireless Innovation Forum Top 10 Most Wanted Wireless Innovations, WINNF-11-P-0014, Version V1.0.1, Oct. 7, 2011, 16 pages.
Lindholm et al., The Java™ Virtual Machine Specification, Java SE 7 Edition, Feb. 6, 2012, 606 pages.
Bhattacharyya et al., Overview of the MPEG Reconfigurable Video Coding Framework, J Sign Process Syst (2011) 63:251-263; DOI 10.1007/s11265-009-0399-3, 2009 Springer Science + Business Media, LLC., 13 pages.
International Search Report and Written Opinion for PCT Application No. PCT/US2013/058654, mailed on Jun. 30, 2014, 11 pages.
Durand et al., "The Radio Virtual Machine: A Solution for SDR Portability and Platform Reconfigurability", IEEE, 2009, 4 pages.
Office Action for Taiwanese Patent Application No. 103127456, mailed Jul. 17, 2015, 13 pages, including 1 page of English translation.
Office Action for Taiwanese Patent Application Serial No. 103127456, mailed on Feb. 15, 2016, 7 pages (including 1 page of English translation).
International Preliminary Report on Patentability for PCT/US2013/058654, mailed on Mar. 17, 2016, 8 pages.
Office Action for Taiwanese Patent Application No. 103127456, mailed on Nov. 8, 2016, 8 pages. (Including 1 page of English translation).

* cited by examiner

DEVICE, SYSTEM AND METHOD OF CONFIGURING A RADIO TRANSCEIVER

CROSS REFERENCE

This application is a National Phase Application of PCT International Application No. PCT/US2013/058654, International Filing Date Sep. 8, 2013, the entire disclosure of which is incorporated herein by reference.

TECHNICAL FIELD

Embodiments described herein generally relate to configuring a radio transceiver.

BACKGROUND

A radio transceiver may be configured to support a radio access technology (RAT). For example, the radio transceiver may support a Wireless Fidelity (WiFi) technology, a Long Term Evolution (LTE) technology, a $3^{rd}$ Generation (3G) technology, and/or any other RAT.

A hardware platform of the radio transceiver may include one or more hardware elements having different levels of programmability and/or reconfiguration.

A reconfigurable radio transceiver may enable reconfiguring one or more radio attributes of the transceiver, for example, carrier frequencies, a spectrum bandwidth, a modulation technique, a coding technique, and/or any other radio attribute, for example, by reconfiguring the hardware elements.

A manufacturer of radio transceivers may manufacture a radio transceiver, which may support a few fixed predefined RATs.

The radio transceiver may not be able to support other RATs, without platform hardware modifications.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
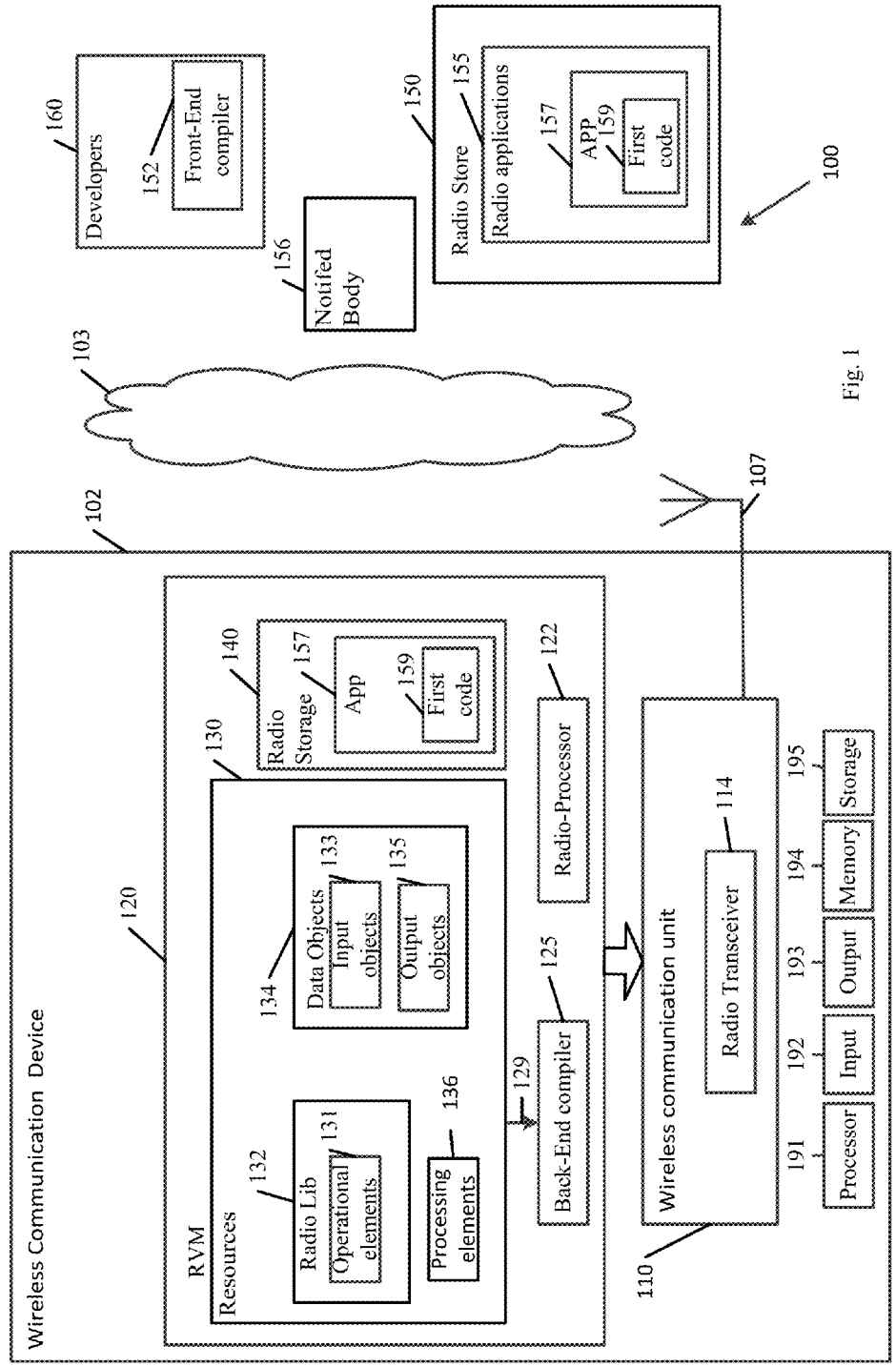
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) ("*IEEE*802.11-09/0308*r*12—*TGac Channel Model Addendum Document*"); *IEEE* 802.11 *task group ad* (*TGad*) (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band,* 28 *Dec.,* 2012)) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.3, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), 3GPP Long Term Evolution Advanced (LTE-A) (including Release 10, 11, 12 and/or 13), and/or future versions and/or derivatives thereof, devices and/or networks operating in accordance with existing World-Wide-Web Consortium (W3C) standards, including the *W*3*C Hypertext Markup Language* (*HTML*) *Version* 5, *October* 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), FOMA (Freedom of Multimedia Access), 3GPP LTE (Long Term Evolution), 3GPP LTE Advanced (Long Term Evolution Advanced), CDPD (Cellular Digital Packet Data), CSD (Circuit Switched Data), HSCSD (High-Speed Circuit-Switched Data), UMTS (3G) (Universal Mobile Telecommunications System (Third Generation)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

Some demonstrative embodiments may be used in conjunction with a cellular communication network communicating over Long Term Evolution (LTE) communication network. Other embodiments may be implemented utilizing any other suitable cellular communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a wireless communication device 102. Wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, wireless communication device 102 may include a mobile device. In other embodiments, device 102 may include a non-mobile device.

In some demonstrative embodiments, wireless communication device 102 may include, for example, a PC, a desktop computer, a mobile computer, a laptop computer, a notebook computer, a tablet computer, an Ultrabook™ computer, a mobile internet device, a server computer, a handheld computer, a handheld device, a PDA device, a handheld PDA device, an on-board device, an off-board device, a hybrid device (e.g., combining cellular phone functionalities with PDA device functionalities), a wearable device, an Internet of Things (IoT) device, a Machine to Machine (M2M) device, a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, a video sink, a stereo tuner, a flat panel display, a Personal Media Player (PMP), a digital video camera (DVC), a gaming device, a Digital Still camera (DSC), a media player, a Smartphone, a television, or the like.

In some demonstrative embodiments, wireless communication device 102 may also include, for example, a processor 191, an input unit 192, an output unit 193, a memory unit 194, and a storage unit 195. Wireless communication device 102 may optionally include other suitable hardware components and/or software components. In some demonstrative embodiments, some or all of the components of mobile device wireless communication device 102 may be enclosed in a common housing or packaging, and may be interconnected or operably associated using one or more wired or wireless links. In other embodiments, components of wireless communication device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 102 and/or of one or more suitable applications.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, wireless medium 103 may include for example, a Radio Frequency (RF) channel, an IR channel, a WiFi channel, a wireless display (WiDi) channel, a Bluetooth channel, a cellular channel, a Global Navigation Satellite System (GNSS) channel, a Near Field Communication (NFC) channel, a Hybrid Digital Radio (HDR) channel, a Frequency Modulation (FM) channel, and the like.

In some demonstrative embodiments, wireless communication device 102 may include a wireless communication unit 110 to perform wireless communication between wireless communication device 102 and one or more other wireless communication devices.

In some demonstrative embodiments, wireless communication unit 110 may be associated with one or more antennas 107. Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a single element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication unit 110 may include a radio transceiver 114. For example, radio transceiver 114 may include one or more wireless transmitters, receivers and/or transceivers able to send and/or receive wireless communication signals, RF signals, frames, blocks, transmission streams, packets, messages, data items, and/or data. In one example, radio transceiver 114 may include one or more hardware elements, e.g., modulation elements, demodulation elements, amplifiers, analog to digital and digital to analog converters, filters, and/or the like. For example, wireless communication unit 110 may include or may be implemented as part of a wireless Network Interface Card (NIC), and the like.

In some demonstrative embodiments, radio transceiver 114 may support a first radio access technology (RAT). For example, the one or more hardware elements of radio transceiver 114 may support a WiFi technology, an LTE technology, a 3G technology, or any other technology.

In some demonstrative embodiments, radio transceiver 114 may include a reconfigurable radio, for example, the one or more hardware elements of radio transceiver 114 may be reconfigurable, e.g., having programming and/or reconfiguration capabilities.

In some demonstrative embodiments, reconfiguring of radio transceiver 114 may enable supporting a second RAT, e.g., different from the first RAT, for example, without modifying the hardware elements of radio transceiver 114.

In one example, radio transceiver 114 may be configured to support a first type of technology, e.g., a WiFi technology. According to this example, reconfiguring of radio transceiver 114 may enable radio transceiver 114 to support a second type of technology, e.g., an LTE technology, for example, to communicate with a cellular base station.

In another example, radio transceiver 114 may be configured to support a first type of WLAN communication, e.g., WLAN communication according to the *IEEE* 802.11- 2012 specification. According to this example, reconfiguring of radio transceiver 114 may enable radio transceiver 114 to support a second type of WLAN communication, e.g., WLAN communication according to the *IEEE* 802.11 *TGac* specification.

In some demonstrative embodiments, radio transceiver 114 may be reconfigured by a reconfiguration code, e.g., an execution (exe) code, provided by a manufacturer of radio transceiver 114. For example, the manufacturer of radio transceiver 114 may provide a reconfiguration code to reconfigure radio transceiver 114 to support communication according to the LTE technology.

In some demonstrative embodiments, the reconfiguration code provided by the manufacturer may be dependent on the hardware elements of radio transceiver 114.

In one example, a first reconfiguration code to reconfigure a first radio transceiver to support communication according to the LTE technology may be different from a second reconfiguration code to reconfigure a second radio transceiver to support communication according to the LTE technology, for example, if the hardware elements of the first and second radio transceivers are different.

Some demonstrative embodiments may enable reconfiguring a radio transceiver, e.g., independent of the hardware elements of the radio transceiver.

Some demonstrative embodiments may enable reconfiguring radios of different manufacturers and/or radios having different configurations, for example, independent of the configurations of the radios.

Some demonstrative embodiments may enable reconfiguring the radio transceiver, for example, without any modification to the hardware elements of the radio transceiver.

Some demonstrative embodiments may include a radio virtual machine (RVM) 120 to configure radio transceiver 114, e.g., as described below.

In some demonstrative embodiments, RVM 120 may be implemented as part of device 102, for example, embedded as part of wireless communication unit 110, e.g., as described below.

In other embodiments, RVM 120 may be implemented as another element of system 100, for example, separate from device 102, e.g., as described below with reference to FIGS. 5 and/or 6.

In some demonstrative embodiments, RVM 120 may include a radio processor (RP) 122 to execute a first code 159 configuring one or more transceiver functionalities independent of the configuration of radio transceiver 114.

In some demonstrative embodiments, RVM 120 may download first code 159 from a radio application store (RAS) 150.

In some demonstrative embodiments, RAS 150 may store a plurality of configuration code elements 155 ("radio applications 155") defining a plurality of different transceiver configuration schemes.

In some demonstrative embodiments, a configuration code element of the plurality of configuration code elements 155 (a radio application) may define a transceiver configuration scheme. For example, a radio application may define a WiFi transceiver configuration scheme, an LTE transceiver configuration scheme and/or any other RAT transceiver configuration scheme.

In some demonstrative embodiments, a radio application 157 of radio applications 155 may include first code 159 to configure the one or more transceiver functionalities according to the transceiver configuration scheme. For example, radio application 157 may include first code 159 to configure one or more transceiver functionalities of a radio according to the WiFi transceiver configuration scheme, according to the LTE transceiver configuration scheme and/or according to any other RAT transceiver configuration scheme.

In some demonstrative embodiments, a radio application, e.g., radio application 157, may be configured to receive from one or more elements of a device, e.g., device 102, data packets to be transmitted by a radio transceiver, e.g., radio transceiver 114, and to transform the data packets into radio waves to be transmitted by the radio transceiver; and/or to receive radio waves received by the radio transceiver, e.g., radio transceiver 114, and to transform the received radio waves into data packets to be processed by one or more elements of the device.

In some demonstrative embodiments, the radio application, e.g., radio application 157, may be configured to provide, e.g., to one or more elements of device 102, information relating to a radio spectrum utilized to communicate the radio waves.

In some demonstrative embodiments, first code 159 may enable radio application 157 be to be interpreted and executed by RVM 120, e.g., independent of the configuration of radio transceiver 114.

In some demonstrative embodiments, first code 159 may enable radio application 157 be to be executed on any RVM, e.g., independent of configurations of any radio transceivers.

In some demonstrative embodiments, first code 159 may represent the transceiver configuration scheme, for example, as a configcode at an extensible markup language (XML) format. In another embodiments, first code 159 may be represented in any other format or language.

In some demonstrative embodiments, radio applications 155 may be created by one or more developers 160, for example, a software developer, a software company and/or any other entity.

In some demonstrative embodiments, developers 160 may utilize any suitable programming language and/or any suitable radio library modules to create radio application 157.

In some demonstrative embodiments, radio application 157 may be created from a source code utilizing the programming language and/or the radio library modules. For example, the source code may be written in C, C++, and/or any other suitable programming language.

In some demonstrative embodiments, the source code may be compiled by a front-end (FE) complier 152 to transform the source code and to generate first code 159 of radio application 157.

In some demonstrative embodiments, developers 160 may use FE compiler 152, e.g., in order to compile radio application 157. In other embodiments, FE compiler 152 may be provided as a service to developers 160, e.g., a web service, a cloud service, and/or any other remote software service.

In some demonstrative embodiments, radio application 157 may be authenticated by a certification entity 156, e.g., a notified body (NB), configured to certify a conformity and/or compliance of first code 159 with applicable regulations and standards. For example, the NBs may perform technical conformity tests on first code 159.

In some demonstrative embodiments, developers 160 may certify radio application 157, for example, by sending radio application 157 to certification entity 156.

In some demonstrative embodiments, certification entity 156 may certify first code 159, for example, by providing a certification to radio application 157.

In some demonstrative embodiments, developers 160 may upload radio application 157 into RAS 150 including the certified first code, for example, if certification entity 156 certified first code 159.

In one example, a software developer may write a source code to configure one or more transceiver functionalities according to the LTE configuration scheme. The developer may compile the source code utilizing FE compiler 152 to generate first code 159. The developer may certify first code 159 at certification entity 156, and may receive certification from certification entity 156. The developer may upload first code 159 to RAS 150. RAS 150 may store first code 159 as radio application 157 to be used to configure one or more transceiver functionalities according to the LTE transceiver configuration scheme, e.g., independent of the configuration of any radio transceiver.

In some demonstrative embodiments, RP 122 may download radio application 157, e.g., from RAS 150, to configure one or more transceiver functionalities of radio transceiver 114, for example, according to the LTE configuration scheme.

In some demonstrative embodiments, RP 122 may certify first code 159 of radio application 157 at certification entity 156, e.g., before downloading radio application 157 from RAS 150. For example, RVM 120 may authenticate first code 159, e.g., to assure validity of the certification of radio application 157.

In some demonstrative embodiments, RP 122 may not download and/or may not execute first code 159, for example, if the certification of radio application 157 is not valid and/or radio application 157 does not have a certification.

In some demonstrative embodiments, RP 122 may access one or more radio resources of radio 114 to configure the one or more transceiver functionalities for radio 114 based on the certificate.

In some demonstrative embodiments, the radio resources may include any hardware and/or software resource, which may be used to configure the one or more transceiver functionalities for radio 114, e.g., the hardware elements of radio 114.

In some demonstrative embodiments, RVM 120 may enable RP 122 to access the radio resources according to one or more predefined levels of access ("execution environment classes") to configure the one or more transceiver functionalities for radio 114.

In some demonstrative embodiments, the certificate may indicate a level of access according to which RP 122 may access the one or more radio resources of radio 114.

In some demonstrative embodiments, RVM 120 may enable a limited access to the radio resources of radio 114 according to a first level of access ("a very restricted execution environment class"). For example, the first level of access may enable access to only basic radio parameters of radio 114.

In some demonstrative embodiments, a certificate to access the radio resources of radio 114 according to the first level of access may be obtained, e.g., from certification entity 156, according to a relatively easy and/or "light" certification procedure. In other embodiments, no certificate may be required to access the radio resources of radio 114 according to the first level of access.

In some demonstrative embodiments, RVM 120 may enable a moderate access to the radio resources of radio 114 according to a second level of access ("a moderately restricted execution environment class"). For example, the second level of access may enable access to only a number of radio resources of radio 114, e.g., including the basic radio resources of the first level of access.

In some demonstrative embodiments, a certificate to access the radio resources of radio 114 according to the second level of access may be obtained, e.g., from certification entity 156, according to a relatively moderate certification procedure, e.g., a procedure more complicated than the procedure for obtaining the certificate for the first level of access.

In some demonstrative embodiments, RVM 120 may enable full access to the radio resources of radio 114 according to a third level of access ("a very open execution environment classes"). For example, the third level of access may enable full access to the radio resources of radio 114.

In some demonstrative embodiments, a certificate to access the radio resources of radio 114 according to the third level of access may be obtained, e.g., from certification entity 156, according to a relatively complicated and/or restricted certification procedure.

In some demonstrative embodiments, RVM 120 may be configured to enable any other number, e.g., less than or more than three, of levels of access to configure the one or more transceiver functionalities for radio 114. For example, a number of types of certificates obtained from certification entity 156 may correspond to the number of level of access.

In some demonstrative embodiments, the levels of access may be configured to restrict access to one or more resources of the radio resources of radio 114.

In one example, the levels of access may be configured to restrict output power levels; power spectral density levels; a band width; out of band radiation masks and/or levels; modulation types, e.g., CDMA, WCDMA, OFDM, OFDM-A, Single Carrier, TDS-OFDM, PRP-OFDM, IOTA-OFDM, SC-FDMA and the like; an Analog-to-Digital Converter (ADC) precision and/or speed; a Digital-to-Analog Converter (ADC) precision and/or speed; an antenna selection; a number of sub-carriers to be selected; a sub-carrier spacing to be selected; MIMO techniques (multiple-input-multiple-output multi-antennas techniques) to be selected; FEC (Forward Error Correction) techniques to be selected; Duplex techniques to be selected, e.g., FDD, TDD, and the like; MAC techniques to be selected, e.g., TDMA, FDMA, CSMA, and the like.

In some demonstrative embodiments, the levels of access may restrict the one or more resources of the radio resources of radio 114 based on one or more conditions. For example, RP 122 may modify an output power level of radio 114 by selecting a power level from a first predefined set of power output levels, e.g., [p1 . . . p2], for example, if RP 122 modifies only the output power level of radio 114. In another example, RP 122 may modify the output power level of radio 114 by selecting the power level from a second, e.g., different, predefined set of power output levels, e.g., [p1 . . . p3] wherein p3<p2, for example, if RP 122 modifies the output power level of radio 114 and a MIMO technique of radio 114.

In some demonstrative embodiments, device 102 may include radio storage 140 to store first code 159 of radio application 157.

In some demonstrative embodiments, radio storage 140 may store one or more radio applications of radio applications 155.

In some demonstrative embodiments, radio storage 140 may be included as part of storage unit 195. In other embodiments, radio storage 140 and storage unit 195 may be implements as a separate elements of device 102. For example, radio storage 140 may be implemented as part of RVM 120.

In some demonstrative embodiments, RVM 120 may retrieve radio application 157 from storage 140 and may execute first code 159 of radio application 157 to configure the one or more transceiver functionalities of radio transceiver 114, for example, according to the LTE configuration scheme.

In some demonstrative embodiments, RVM 120 may generate a second code 129 based on first code 159 and the configuration of radio 114.

In some demonstrative embodiments, RVM 120 may include one or more generic resources 130 to control radio transceivers having a plurality of different transceiver configurations.

In some demonstrative embodiments, generic resources 130 may be configured to control the configuration of radio 114.

In some demonstrative embodiments, RVM 120 may generate second code 129 by executing radio application 157 and/or using generic resources 130, e.g., as described below.

In some demonstrative embodiments, generic resources 130 may include a radio library (lib) 132, processing elements 136, and/or data objects 134, e.g., as described below.

In some demonstrative embodiments, radio lib 132 may include one or more operational elements 131 configured to perform radio signal processing, e.g., as described below.

In some demonstrative embodiments, operational elements 131 may include one or more basic operations ("fine-grained operational elements"), e.g., addition, multiplication, and/or the like.

In some demonstrative embodiments, operational elements 131 may include one or more complex operations ("coarse-grained operational elements") for example, complex multiplication, butterfly operations, Fast Fourier Transform (FFT) operations, Viterbi decoder operations, Infinite impulse response (IIR) filter operations and/or any other operations and/or functions relating to radio signal processing.

In some demonstrative embodiments, the coarse-grained operational elements may be based on the fine-grained operational elements, e.g., as described below with reference to FIG. 2.

In some demonstrative embodiments, processing elements 136 may include one or more processing elements configured to execute operational elements 131 of radio lib 132. For example, a processing element of processing elements 136 may be configured to process an FFT operation.

In some demonstrative embodiments, data objects 134 may include one or more data objects for processing operational elements 131.

In some demonstrative embodiments, data objects 134 may include one or more abstract resources. For example, data objects 134 may include any abstraction of memory 194, e.g., a cache.

In some demonstrative embodiments, data objects 134 may include input data objects 133 to be utilized as an input to operational elements 131 of radio lib 132. In one example, processing elements 136 may read from input data objects 133 data required for an FFT operation of radio lib 132. In another example, processing elements 136 may read from input data objects 133 octets of a data payload from a MAC layer for a radio signal.

In some demonstrative embodiments, data objects 134 may include output data objects 135 to output data of operational elements 131. In one example, processing elements 136 may write data into output data objects 135, e.g., when executing the FFT operation of operational elements 131.

In some demonstrative embodiments, RVM 120 may execute first code 159, for example, when input data objects 133 are initialized and output data objects 135 are empty. For example, RVM 120 may not execute first code 159, for example, if input data objects 133 are empty and/or output data objects 135 are full.

In some demonstrative embodiments, RVM 120 may be data driven. For example, RVM 120 may execute first code 159 upon initializing input data objects 133, e.g., as described above. Accordingly, RVM 120 may not require any control, e.g., control signals, control elements and/or any other kind of controlling.

In some demonstrative embodiments, the transceiver configuration scheme of radio application 157 may be represented as a relation between operational elements 131 of radio lib 132 and data objects 134. For example, the transceiver configuration scheme may be represented as a bipartite graph, e.g., wherein first nodes of the graph are data objects 134 and second nodes of the graph are operational elements 131. Edges of the graph may be connected only between data objects 134 and operational elements 131.

In some demonstrative embodiments, the edges of the graph may represent one or more relations between the first and second nodes of the graph. For example, a first relation may represent reading from an input data object of input data objects 133 into an operational element of radio lib 132; a second relation may represent writing into an output data object of output data objects 135, e.g., when processing elements 136 execute operational elements 131; and/or a third relation may represent reading from an input data object of input data objects 133 into an operational element of radio lib 132 and erasing the input data object, e.g., after reading the data.

In some demonstrative embodiments, RP 122 may execute first code 159 of radio application 157 according to the transceiver configuration scheme of application 157. For example, RP 122 may initialize input data objects 133 for execution of radio application 157. Upon initialization of input data objects 133, processing elements 136 may process operational elements of radio lib 132, e.g., corresponding to input data objects 132. RP 122 may write data into data outputs 135, e.g., data resulting from the execution of the operational elements. RP 122 may complete execution of radio application 157, for example, when input data objects 133 are empty.

In some demonstrative embodiments, RP 122 may generate second code 129 of radio application 157, for example, when executing first code 159, e.g., as described above.

In some demonstrative embodiments, RP 122 may generate second code 129 based on first code 159 and on the configuration of radio transceiver 114.

In some demonstrative embodiments, second code 129 may enable configuring one or more transceiver functionalities customized with respect to radio transceiver 114, e.g., compared to first code 159, which may enable configuring one or more transceiver functionalities of a plurality radio transceiver configurations, e.g., any radio transceiver configuration.

In some demonstrative embodiments, second code 129 may correspond to the configuration of radio transceiver 114.

In one example, first and second radios may download radio application 157 including a first code to configure transceiver functionalities according to the LTE configuration scheme. According to this example, a first version of the second code generated by an RVM of the first radio based on radio application 157 may be different from a second version of the second code generated by an RVM of the second radio based on radio application 157, for example, if configurations of the first and second radios are different.

In some demonstrative embodiments, second code 129 may be compiled by a back-end (BE) compiler 125, e.g., as described below.

In some demonstrative embodiments, a configuration of BE compiler 125 may correspond to the configuration of radio transceiver 114.

In some demonstrative embodiments, RVM 120 may generate second code 129 corresponding to the configuration of radio transceiver 114, for example, to enable BE compiler 125 to compile second code 129.

In some demonstrative embodiments, BE compiler 125 may compile and transform radio application 157 including second code 129 into radio application 157 including an execution (exe) code.

In some demonstrative embodiments, BE compiler 125 may compile second code 129 into the exe code in run-time, e.g., by performing just in time (JIT) compilation. For example, BE compiler 125 may compile second code 129 into exe code, and RP 122 may execute the exe code on radio transceiver 114, e.g., upon execution of first code 159 on RVM 120. According to this example, RVM 120 may be utilized as an interpreter of first code 159.

In other embodiments, BE compiler 125 may compile second code 129 into the exe code before run-time, e.g., by performing ahead of time (AOT) compilation. For example, BE compiler 125 may compile second code 129 into the exe code, and RP 122 may execute the exe code on radio transceiver 114, e.g., after BE compiler 125 generates the exe code.

In some demonstrative embodiments, the exe code may correspond to the configuration of radio transceiver 114, and may be configured to be executed on radio transceiver 114, for example, since the exe code was generated by BE complier 125, which corresponds to the configuration of radio transceiver 114.

In some demonstrative embodiments, the exe code may enable radio application 157 to be executed on radio transceiver 114 and to configure the one or more transceiver functionalities of radio transceiver 114.

In some demonstrative embodiments, RP 122 may certify the exe code, e.g., utilizing self-certification. For example, RP 122 may certify the exe code by executing the exe code on radio transceiver 114.

In some demonstrative embodiments, RVM 120 may perform a 2-step certification procedure. For example, the first step may include certifying first code 159 by notified body 156; and/or the second step may include certifying the exe code by RP 122, e.g., as described above.

In some demonstrative embodiments, the 2-step certification procedure may increase credibility of RVM 120 and/or may enable to reduce errors, e.g., resulting from application 157.

In some demonstrative embodiments, RP 122 may execute the exe code of radio application 157 on radio transceiver 114 to configure the one or more functionalities of radio transceiver 114.

In some demonstrative embodiments, RVM 120 may enable execution of radio application 157 on different configurations of radio transceivers, e.g., independent of the configurations provided by radio manufacturers of the radio transceivers.

In some demonstrative embodiments, RVM 120 may support concurrent computations including, for example, parallel access to a memory. For example, processing elements 136 may concurrently access data objects 134.

In some demonstrative embodiments, RVM 120 may support streaming of data. For example, RVM 120 may support operations on multiple or a relatively large number of incoming data. For example, processing elements 136 may read and erase data from input data objects 133, e.g., every time data is initialized at input data objects 133.

In some demonstrative embodiments, RVM 120 may be data driven, e.g., as described above.

In some demonstrative embodiments, RVM 120 may support real-time computation. For example, operations of RVM 120 may be deterministic computations, which may provide timing information on critical processes. For example, RVM 120 may execute operational elements 131 upon initialization of data objects 134 in a deterministic manner, e.g., according to the transceiver configuration scheme.

In some demonstrative embodiments, RVM 120 may support typed computation. For example, data objects 134 may include predefined data types having predefined and/or common word length for representation of data types of data objects 134.

In some demonstrative embodiments, RVM 120 may support dynamic execution. For example, input data objects 133 may be allocated, e.g., in storage 140, memory 194 and/or storage 195, upon initializing of input data objects 133; and/or output data objects 135 may be allocated, e.g., in storage 140, memory 194 and/or storage 195, upon processing an operational element of radio lib 132.

In some demonstrative embodiments, RVM 120 may support semantic integrity under refinement and/or aggregation of one or more operational elements of radio lib 132, e.g., without modifying computation semantics of operational elements 131. For example, operational elements of radio lib 132 may support semantic integrity, for example, when refining the coarse-grained operational elements of operational elements 131 into the fine-grained operational elements of operational elements 131 and/or when aggregating the fine-grained operational elements into the coarse-grained operational elements, without modifying computation semantic, e.g., as described below.

In some demonstrative embodiments, the coarse-grained operational elements may be represented using the fine-grained operational elements. For example, a complex multiplication operation may be represented by an addition operation and an inversion operation.

In some demonstrative embodiments, new coarse-grained operational elements may be built, for example, utilizing the fine-grained operational elements and the coarse-grained operational element.

In some demonstrative embodiments, additional new coarse-grained operational elements may be built, e.g., by repeating the procedure described above.

In some demonstrative embodiments, a procedure to build coarse-grained operational elements, denoted M, from an initial set of fine-grained operational elements, denoted $B^{(0)}$, may be described, e.g., as follows:

$$B^{(0)} = \{+(x,y), \neg(x) | x, y \in H\} \quad (1)$$

wherein, $+(x,y)$ denotes $(x+y)$, e.g., the addition operation; $\neg(x)$ denotes $(-x)$, e.g., the inversion operation; and/or H denotes a selected type of element, e.g., an integer, a floating point, a fixed point or any other type.

In some demonstrative embodiments, M(B) may designate a set of fine-grained and/or coarse-grained operational elements, which may be expressed by the model M based on B.

In some demonstrative embodiments, the coarse-grained operational elements may be built utilizing a recursive procedure, e.g., as follows:

$$B^{(1)} \subset M(B^{(0)}) \backslash B^{(0)}, \quad (2)$$
$$\ldots$$
$$B^{(n+1)} \subset M(B^{(n)}) / B^{(n)}.$$

wherein, $B^{(0)} \subset B^{(1)} \subset \ldots \subset B^{(n)} \succ B^{(n+1)}$, e.g., when $A \subset B$, e.g., if $M(B) \subset M(A)$, for example, due to common recursion operation.

In some demonstrative embodiments, radio lib 132 may enable an optimization of radio application 157 based on the configuration of radio transceiver 114. For example, RVM 120 may generate costumed and/or tailored second code to be executed on radio transceiver 114, for example, when executing operational elements 131.

Figure 2:
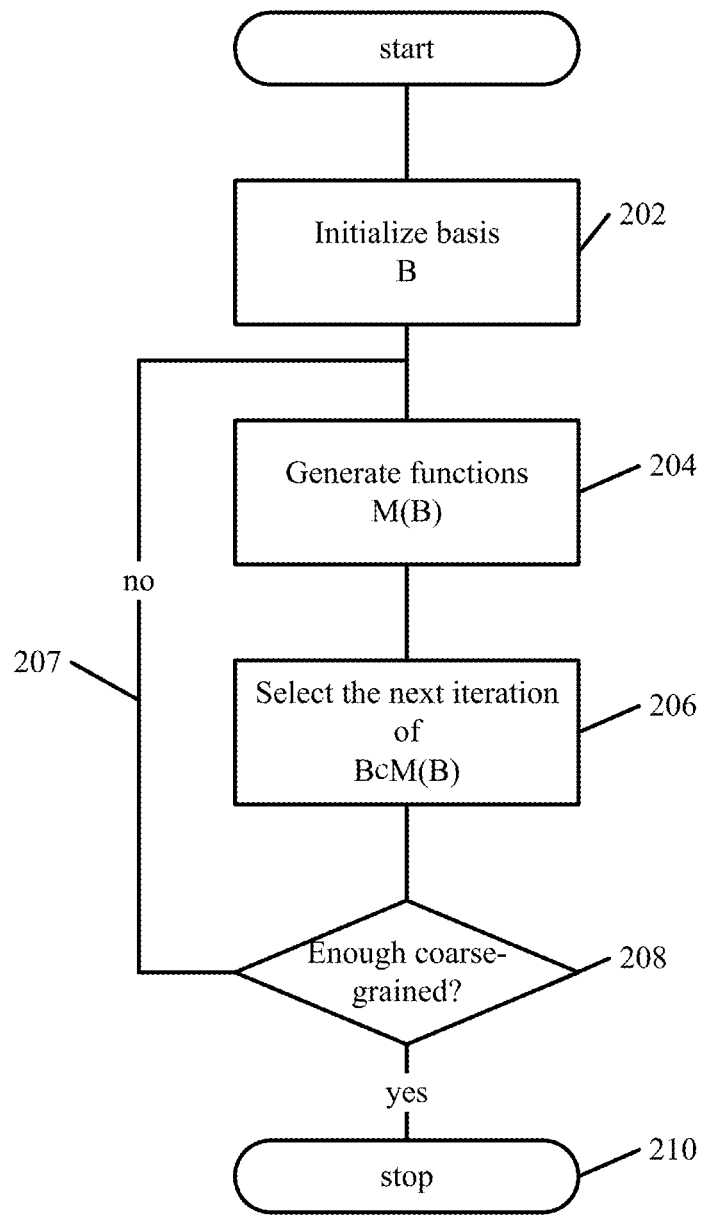
FIG. 2 is a schematic illustration of a method of building a radio library, in accordance with some demonstrative embodiments.

Reference is made to FIG. 2, which schematically illustrates a method of generating a radio library (lib), in accordance with some demonstrative embodiments. For example, the one or more operations of the method of FIG. 2 may be utilized to build operational elements 131 (FIG. 1) of radio lib 132 (FIG. 1).

As indicated at block 202, the method may include initializing a basic set of fine-grained operational elements, for example, according to Equation 1, e.g., as described above.

As indicated at block 204, the method may include generating coarse-grained operational elements (functions), for example, according to the first iteration of Expression 2, e.g., as described above.

As indicated at block 206, the method may include selecting operational elements for the next iteration of the procedure, for example, according to the next iteration of Expression 2, e.g., as described above.

As indicated at block 208, the method may include determining whether or not a number of coarse-grained operational elements is sufficient.

As indicated by arrow 207, the method may include repeating the procedure of generating functions, for example, if the number of coarse-grained operational elements is not sufficient.

As indicated at block 210, the method may include stopping to build the radio lib, for example, if the number of coarse-grained operational elements is sufficient.

Figure 3:
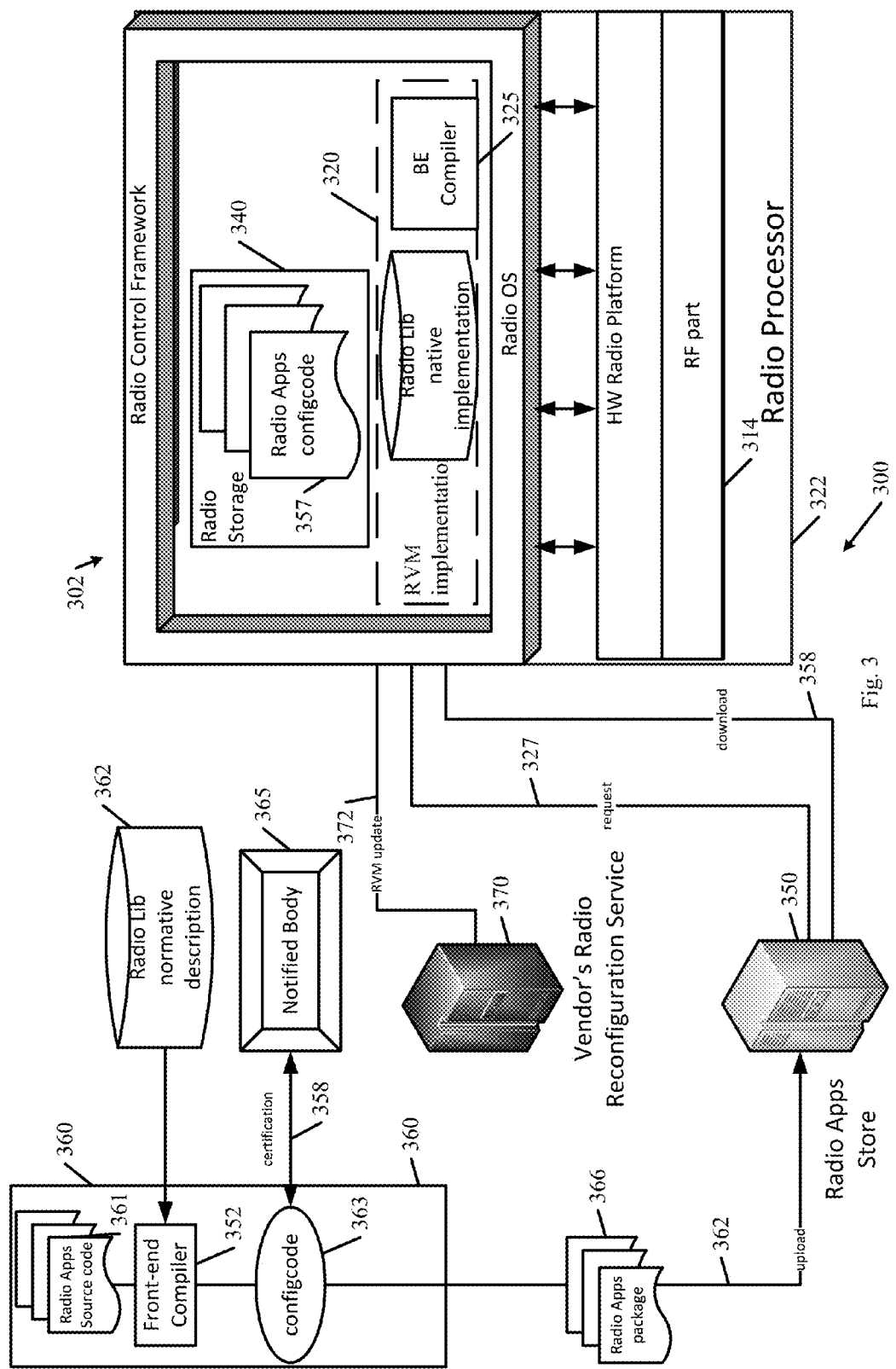
FIG. 3 is a schematic illustration of a system of inline reconfiguration of a radio transceiver, in accordance with some demonstrative embodiments.

Reference is made for FIG. 3, which schematically illustrates a system 300 of inline reconfiguration of a radio transceiver, in accordance with some demonstrative embodiments. For example, one or more elements of system 300 may perform the functionality of one or more elements of system 100 (FIG. 1).

In some demonstrative embodiments, system 300 may be utilized to reconfigure a radio transceiver 314 of a wireless communication device 302 having an RVM 320 embedded on a radio processor (RP) 322 (in-device compilation). For example, radio 314 may perform the functionality of radio transceiver 114 (FIG. 1), RP 322 may perform the functionality of RP 122 (FIG. 1) and/or RVM 320 may perform the functionality of RVM 120 (FIG. 1).

In some demonstrative embodiments, a developer 360 may produce radio application source code 361, and may compile radio application source code 361 into configcode 363 utilizing a FE compiler 352. For example, FE complier 352 may perform the functionality of FE compiler 152 (FIG. 1), configcode 363 may perform the functionality of first code 159, and/or developer 360 may perform the functionality of developers 160 (FIG. 1).

In some demonstrative embodiments, the developer 360 may use any appropriate programming language and/or Radio Library modules 362 to create radio application source code 361.

In some demonstrative embodiments, the developer 360 may use FE compiler 352 to translate radio application source code 361 into configcode 363.

In some demonstrative embodiments, a notified body 365 may certify conformity and/or compliance of reconfigurable radio platforms, databases, radio platforms software and/or any other reconfiguration software with applicable regulations and standards. For example, notified body 365 may certify conformity and compliance of configcode 363 with the applicable regulations and standards, and may return a certification to developer 360. For example, notified body 365 may perform the functionality of certification entity 156 (FIG. 1).

In some demonstrative embodiments, developer 360 may upload (362) a certified configcode 366 ("Radio Apps package") onto a radio application store (RAS) 350. For example, radio application store 350 may perform the functionality of RAS 150 (FIG. 1).

In some demonstrative embodiments, RAS 350 may store radio application software developed by independent developers.

In some demonstrative embodiments, RAS 350 may enable downloading of the radio application software.

In some demonstrative embodiments, a hardware (HW) vendor of radio 314 may provide a Vendor's Radio Reconfiguration Service (VRRS) 370 configured to support radio platforms produced by the HW vendor. For example, VRRS 370 may update (372) RVM 320 with new versions, new tools and/or elements relating to RVM 320.

In some demonstrative embodiments, a radio application stored in RAS 350, e.g., radio apps package 366, may be downloaded (358) into device 302 from RAS 350, for example, upon a request (327) from radio processor (RP) 322.

In some demonstrative embodiments, RP 322 may certify the radio application at NB 365. For example, RP 322 may send a request to NB 365, and NB 365 may send a response, e.g., in response to the request, including a certificate for the radio application.

In some demonstrative embodiments, RP 322 may stop downloading, or may not initialize the downloading of the radio application, for example, if the radio application is not certified by NB 365.

In some demonstrative embodiments, RP 322 may store the radio application downloaded from RAS 350 in a radio storage 340 as a radio Apps configcode 357. For example, radio storage 340 may perform the functionality of radio storage 140 (FIG. 1) and/or radio Apps configcode 357 may perform the functionality of radio application 157 (FIG. 1).

In some demonstrative embodiments, RP 322 may run a back-end (BE) compiler 325 to compile radio apps configcode 357 downloaded from RAS 350 into an exe code. For example, BE compiler 325 may perform the functionality of BE compiler 125 (FIG. 1).

In some demonstrative embodiments, RP 322 may certify the exe code by running a corresponding procedure in radio 314.

In some demonstrative embodiments, RP 322 may execute the exe code to reconfigure radio 314.

In some demonstrative embodiments, RP 322 may store the exe code in radio storage 340, for example, for further use of radio application 357.

Figure 4:
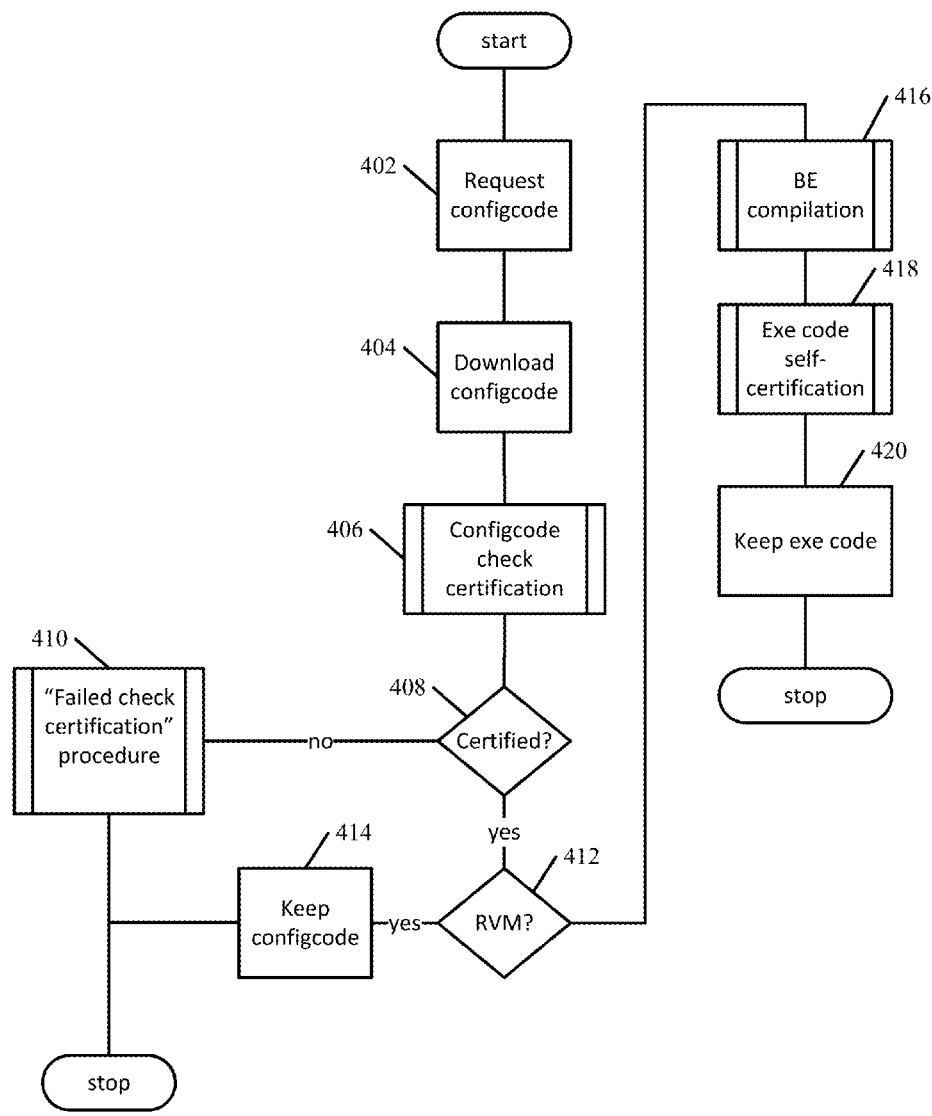
FIG. 4 is a schematic illustration of a method of inline reconfiguration of a radio transceiver, in accordance with some demonstrative embodiments.

Reference is made to FIG. 4, which schematically illustrates a method of reconfiguring a radio transceiver having an embedded RVM (in-device compilation), in accordance with some demonstrative embodiments. In some demonstrative embodiments, one or more of the operations of the method of FIG. 4 may be performed by a suitable wireless communication system, e.g., system 100 (FIG. 1) and/or system 300 (FIG. 3), an RVM, e.g., RVM 120 (FIG. 1) and/or RVM 320 (FIG. 3), and/or a radio processor, e.g., RP 122 (FIG. 1) and/or RP 322 (FIG. 3).

As indicated at block 402, the method may include requesting a configcode. For example, RP 322 (FIG. 3) may request configcode 363 (FIG. 3) from RAS 350 (FIG. 3), e.g., as described above.

As indicated at block 404, the method may include downloading the configcode. For example, RP 322 (FIG. 3) may download configcode 363 (FIG. 3) from RAS 350 (FIG. 3), e.g., as described above.

As indicated at block 406, the method may include checking for certification of the configcode. For example, RP 322 (FIG. 3) may request the certificate of configcode 363 (FIG. 3) from NB 356 (FIG. 3), e.g., as described above.

As indicated at block 408, the method may include determining whether or not the configcode is certified. For example, RP 322 (FIG. 3) may determine whether or not configcode 363 (FIG. 3) is certified, for example, based on the certificate from NB 365 (FIG. 3), e.g., as described above.

As indicated at block 410, the method may include performing a certification-failed procedure, e.g., if the configcode is not certified. For example, RP 322 (FIG. 3) may stop downloading configcode 363 (FIG. 3), e.g., if configcode 363 (FIG. 3) is not certified, e.g., as described above.

As indicated at block 412, the method may include determining whether or not an RVM is embedded on the radio. For example, RP 322 (FIG. 3) may determine whether or not an RVM is embedded on radio 314 (FIG. 3), e.g., as described above.

As indicated at block 414, the method may include maintaining the configcode. For example, RP 322 (FIG. 3) may store radio application 357 (FIG. 3) in radio storage 340 if RVM 320 (FIG. 3) is embedded on radio 314 (FIG. 3), e.g., as described above.

As indicated at block 416, the method may include compiling the configcode by a back-end compiler to generate the exe code, e.g., if an RVM is not embedded on the radio. For example, RP 322 (FIG. 3) may compile radio application 357 (FIG. 3) by BE compiler 325 (FIG. 3) to generate the exe code, e.g., as described above.

As indicated at block 418, the method may include certifying the exe code. For example, RP 322 (FIG. 3) may perform the self-certification of the exe code, e.g., as described above.

As indicated at block 420, the method may include maintaining the exe code. For example, RP 322 (FIG. 3) may store exe code (FIG. 3) in radio storage 340 (FIG. 3), e.g., as described above.

Figure 5:
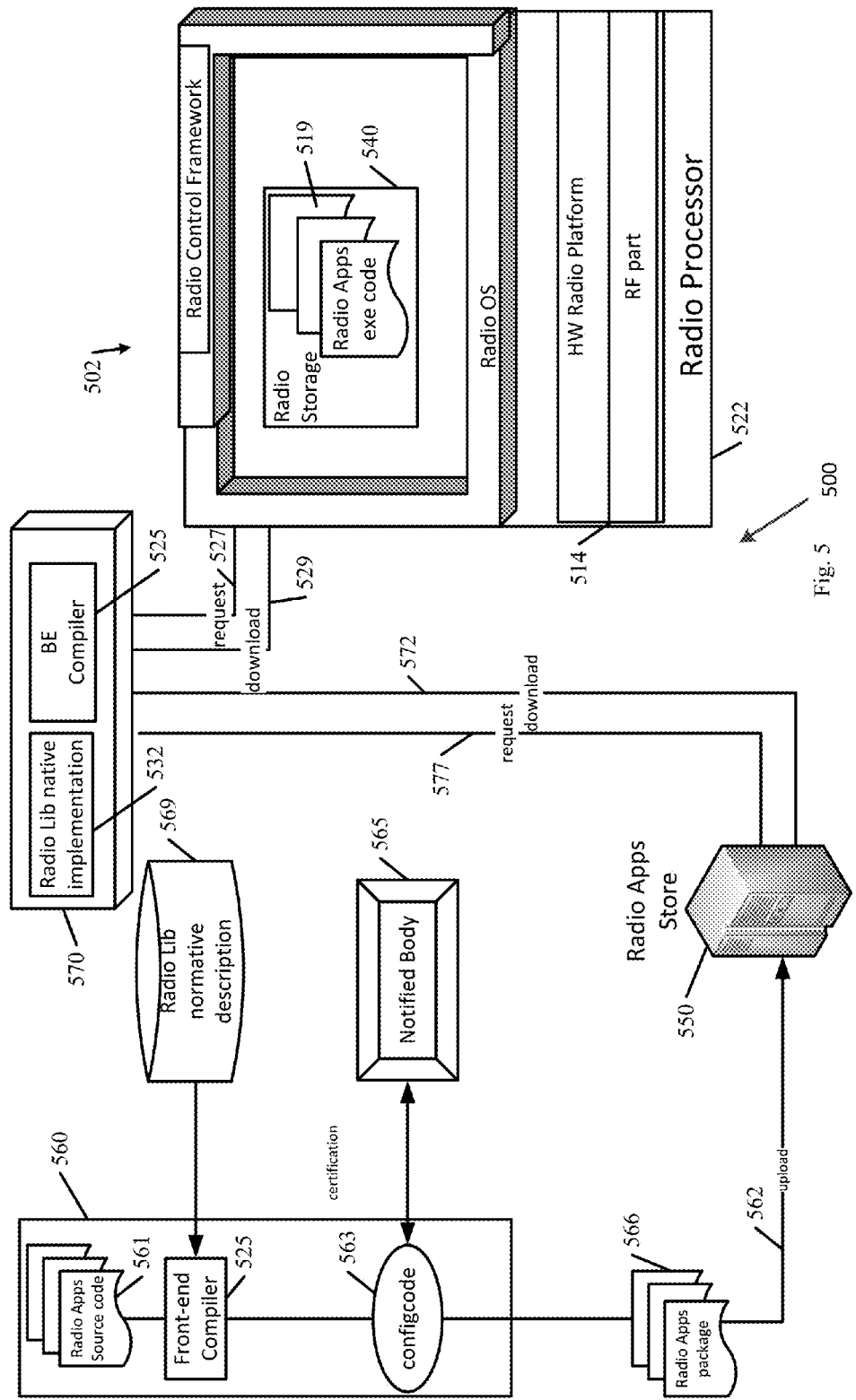
FIG. 5 is a schematic illustration of a system of out-of-device reconfiguration of a radio transceiver, in accordance with some demonstrative embodiments.

Reference is made for FIG. 5, which schematically illustrates a system 500 of out-of-device reconfiguration of a radio transceiver, in accordance with some demonstrative embodiments. For example, one or more elements of system 500 may perform the functionality of one or more elements of system 100 (FIG. 1).

In some demonstrative embodiments, system 500 may be utilized to reconfigure a radio transceiver 514 of a wireless communication device 502 not having an RVM embedded on radio processor (RP) 522 (out-of-device compilation). For example, radio 514 may perform the functionality of radio transceiver 114 (FIG. 1), and/or RP 522 may perform the functionality of RP 122 (FIG. 1).

In some demonstrative embodiments, a developer 560 may produce radio application source code 561, and may compile radio application source code 561 into configcode 563 utilizing a FE compiler 552. For example, FE complier may perform the functionality of FE compiler 152 (FIG. 1), configcode 563 may perform the functionality of first code 159 (FIG. 1), and/or developer 560 may perform the functionality of developers 160 (FIG. 1).

In some demonstrative embodiments, the developer 560 may use any appropriate programming language and/or Radio Library modules 569 to create radio application source code 561.

In some demonstrative embodiments, the developer 560 may use FE compiler 552 to translate radio application source code 561 into configcode 563.

In some demonstrative embodiments, a notified body 565 may certify conformity and/or compliance of Reconfigurable Radio platforms, databases, radio platforms software and/or any other reconfiguration software with applicable regulations and standards. For example, notified body 565 may certify conformity and compliance of configcode 563 with the applicable regulations and standards, and may return a certification to developer 560. For example, notified body 565 may perform the functionality of certification entity 156 (FIG. 1).

In some demonstrative embodiments, developer 560 may upload (562) a certified configcode 566 ("Radio Apps package") onto a radio application store (RAS) 550. For example, radio application store 550 may perform the functionality of RAS 150 (FIG. 1).

In some demonstrative embodiments, RAS 550 may store radio application software developed by independent developers.

In some demonstrative embodiments, a hardware (HW) vendor of radio transceiver 514 may provide a Vendor's Radio Reconfiguration Service (VRRS) 570 configured to support radio platforms produced by the HW vendor.

In some demonstrative embodiments, VRRS 570 may perform the functionality of an RVM, e.g., RVM 120 (FIG. 1), and may execute configcode 563 to generate an exe code to configure radio 514 according to a radio configuration scheme, e.g., an LTE radio configuration scheme.

In some demonstrative embodiments, VRRS 570 may include a back-end (BE) compiler 525 to compile configcode 563 into an exe code. For example, BE compiler 525 may perform the functionality of BE compiler 125 (FIG. 1).

In some demonstrative embodiments, VRRS 570 may include a radio lib 532 including one or more operational elements utilized for execution of configcode 563. For example, radio lib 532 may perform the functionality of radio lib 132 (FIG. 1).

In some demonstrative embodiments, radio processor (RP) 522 may request (527) from VRRS 570 a radio application stored in RAS 550, e.g., radio apps package 566, to configure one or more transceiver functionalities of radio 514 according to a radio transceiver configuration scheme, e.g., the LTE configuration scheme.

In some demonstrative embodiments, VRRS 570 may request (577) the radio application from RAS 550 and may download (572) the radio application from RAS 550, for example, if the radio application is stored in RAS 550.

In some demonstrative embodiments, VRRS 570 may certify the radio application with NB 556. For example, RP 522 may send a certificate request to NB 556 and NB 556 may send a response, e.g., in response to the certificate request, including a certificate for the radio application.

In some demonstrative embodiments, BE compiler 525 may compile the radio application and may generate an exe code 519 for radio 514.

In some demonstrative embodiments, VRRS 570 may certify the exe code, for example, by checking conformity of the exe code to a specification of radio 514.

In some demonstrative embodiments, VRRS 570 may perform both steps of the 2-step certification procedure. For example, the first step may include certifying the radio application at NB 556 and/or the second step may include certifying the exe code, e.g., as described above.

In some demonstrative embodiments, VRRS 570 may transmit (529) the exe code 519 for radio 514 to device 502.

In some demonstrative embodiments, RP 522 may store exe code 519 in a storage 540, for example, storage 540 may perform the functionality of storage 140 (FIG. 1).

In some demonstrative embodiments, RP 522 may execute exe code 519 to configure the one or more transceiver functionalities of radio 514 according to the radio configuration scheme, e.g. the LTE configuration scheme.

Figure 6:
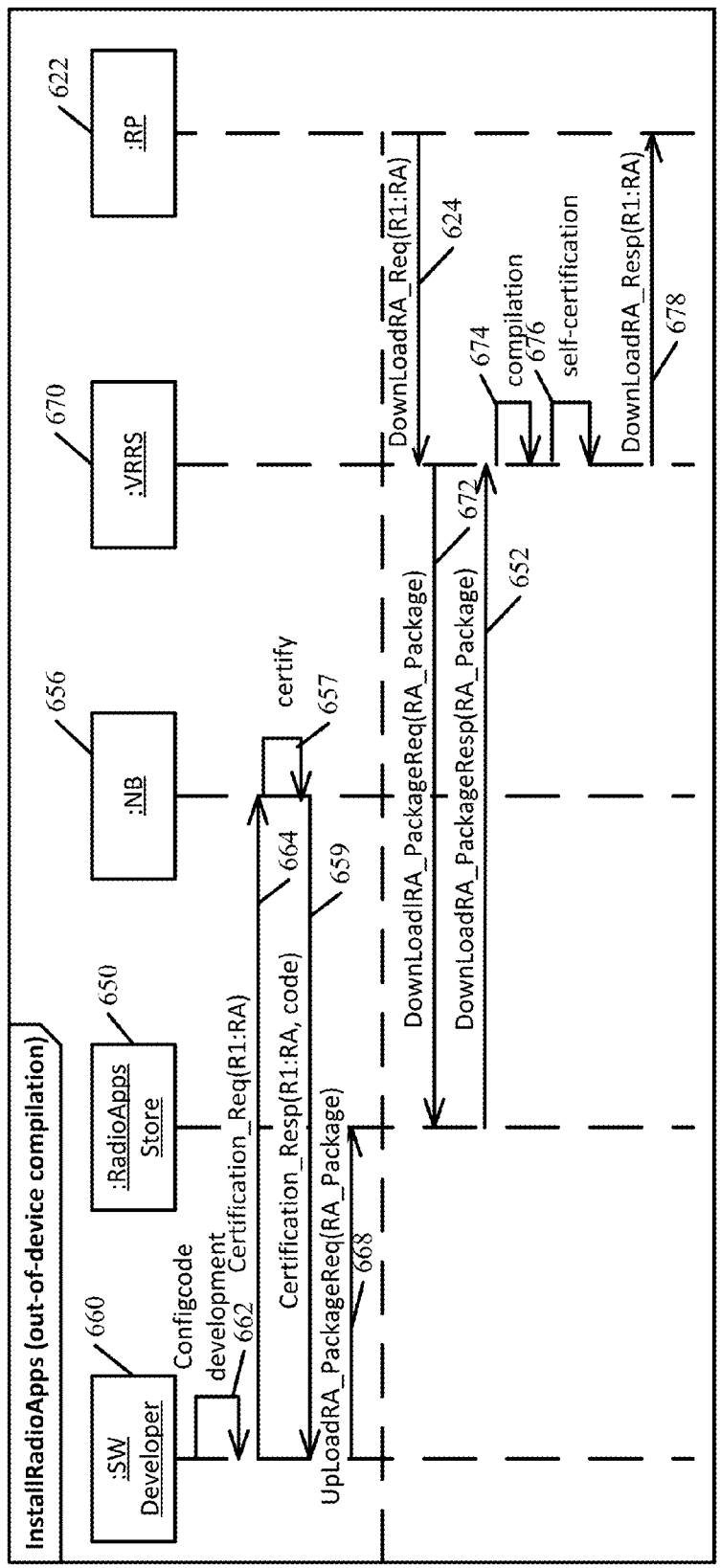
FIG. 6 is a schematic illustration of a method of out-of-device compilation of a radio transceiver, in accordance with some demonstrative embodiments.

Reference is made to FIG. 6, which schematically illustrates a sequence of operations to reconfigure a radio transceiver not having an RVM (out-of device compilation), in accordance with some demonstrative embodiments. For example, one or more of the operations of FIG. 6 may be performed by one or more elements of system 500 (FIG. 5) to reconfigure radio 514 (FIG. 5).

As shown in FIG. 6, a software (SW) developer 660 may develop (662) a configcode, For example, SW developer 660 may develop radio apps source code 561 (FIG. 5) and may compile radio apps source code 561 (FIG. 5) in BE compiler 522 (FIG. 5).

As shown in FIG. 6, SW developer 660 may request (664) from a notified body (NB) 656 to certify the configcode. For example, NB 656 may perform the functionality of NB 556 (FIG. 5).

As shown in FIG. 6, NB 656 may certify the configcode, and may send a certificate (659) to SW developer 660, for example, if the configcode is certified.

As shown in FIG. 6, SW developer 660 may upload (668) the configcode to a radio applications (Apps) store 650, for example, if the configcode is certified. For example, radio application store 650 may perform the functionality of RAS 550 (FIG. 5).

As shown in FIG. 6, a radio processor (RP) 622 may send a request 624 to a Vendor's Radio Reconfiguration Service (VRRS) 670 to download the configcode. For example, VRRS 670 may perform the functionality of VRRS 570 (FIG. 5), and/or RP 622 may perform the functionality of RP 522 (FIG. 5).

As shown in FIG. 6, VRRS 670 may send a request 672 to radio application store 650 to download the configcode.

As shown in FIG. 6, radio application store 650 may send a response 652 to VRRS 670 including the configcode.

As shown in FIG. 6, VRRS 670 may receive the configcode and may compile (674) the configcode to generate an exe code, for example, by BE compiler 525 (FIG. 5)

As shown in FIG. 6, VRRS 670 may certify (676) the exe code, e.g., as described above.

As shown in FIG. 6, RP 622 may download (678) from VRRS 670 the exe code, and may execute the exe code on a radio transceiver, e.g., radio transceiver 514 (FIG. 5), to reconfigure the radio transceiver according to the radio application, for example, if the exe code was certified by VRRS 370.

Figure 7:
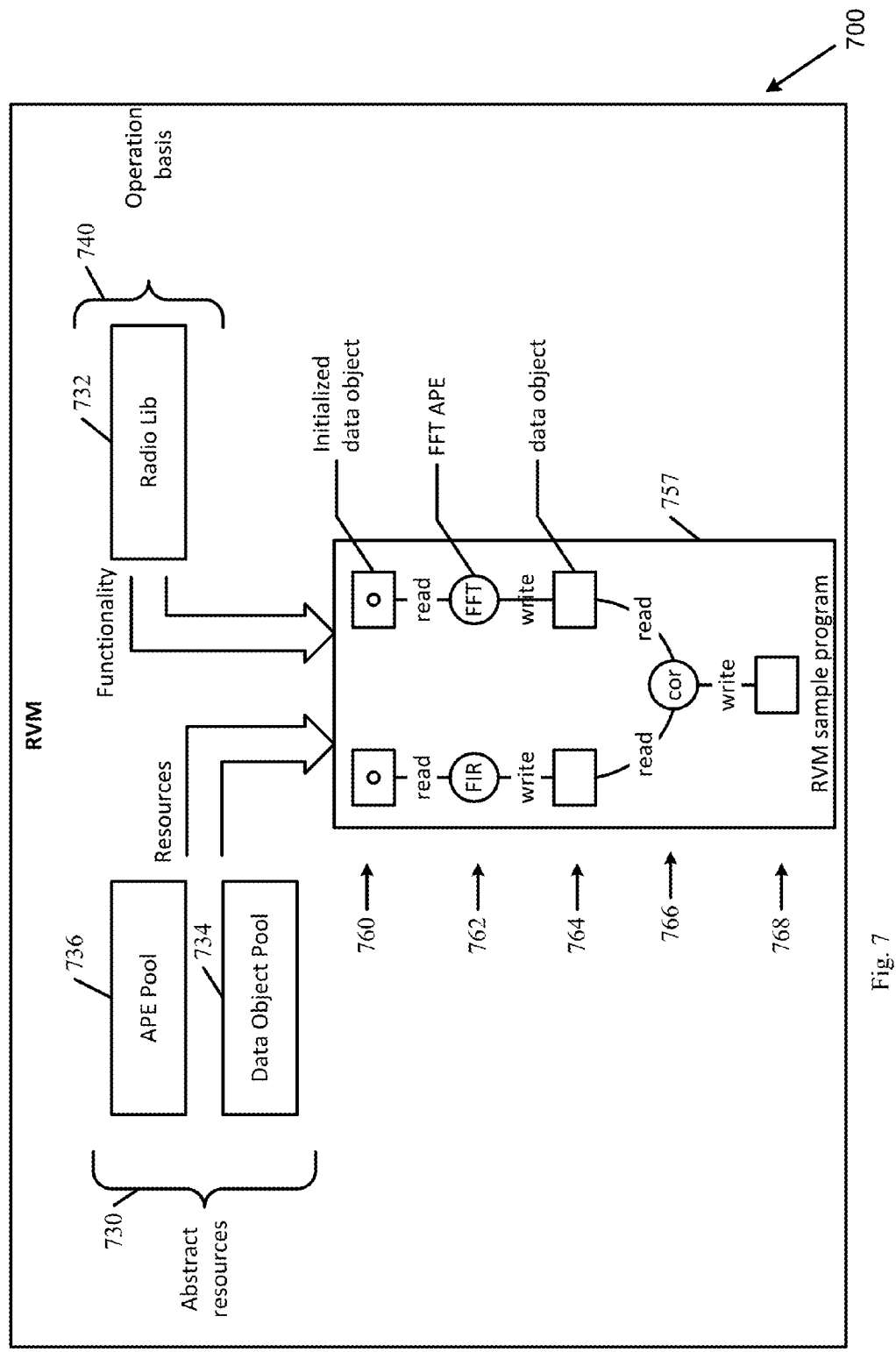
FIG. 7 is a schematic illustration of a conceptual radio virtual machine (RVM), in accordance with some demonstrative embodiments.

Reference is made to FIG. 7, which schematically illustrates a conceptual illustration of an RVM 700, in accordance with some demonstrative embodiments. For example, RVM 700 may perform the functionality of RVM 120 (FIG. 1).

As shown in FIG. 7, RVM 700 may include abstract resources 730 including processing elements (APE Pool) 736 and data objects 734. For example, processing elements 736 may perform the functionality of processing elements 136 (FIG. 1) and/or data objects 734 may perform the functionality of data objects 134 (FIG. 1).

As shown in FIG. 7, RVM 700 may include operational resources 740 including a radio lib 732, which may include one or more operational elements. For example, radio lib 732 may perform the functionality of radio lib 132 (FIG. 1).

As shown in FIG. 7, RVM 700 may execute a radio program 757, e.g., radio application 157 (FIG. 1), utilizing abstract resources 730 and/or operational resources 740, e.g., as described below.

As shown in FIG. 7, RVM 700 may initialize input data objects 760. Upon initialization of data objects 760, processing elements 736 may process corresponding operational elements 762 of radio lib 732, e.g., an FIR operational element and an FFT operational element.

As shown in FIG. 7, processing of operational elements 762 may produce output data objects 764, e.g., an output data of the FIR and the FFT operational elements.

As shown in FIG. 7, once output data objects 764 are initialized, processing elements 736 may process corresponding operational element 766 utilizing output data objects 764 as an input to operational element 766, e.g., a correlator (COR) operational element to calculate a correlation.

As shown in FIG. 7, processing of operational element 766 may produce output data object 768, e.g., an output data of COR operational element.

Figure 8:
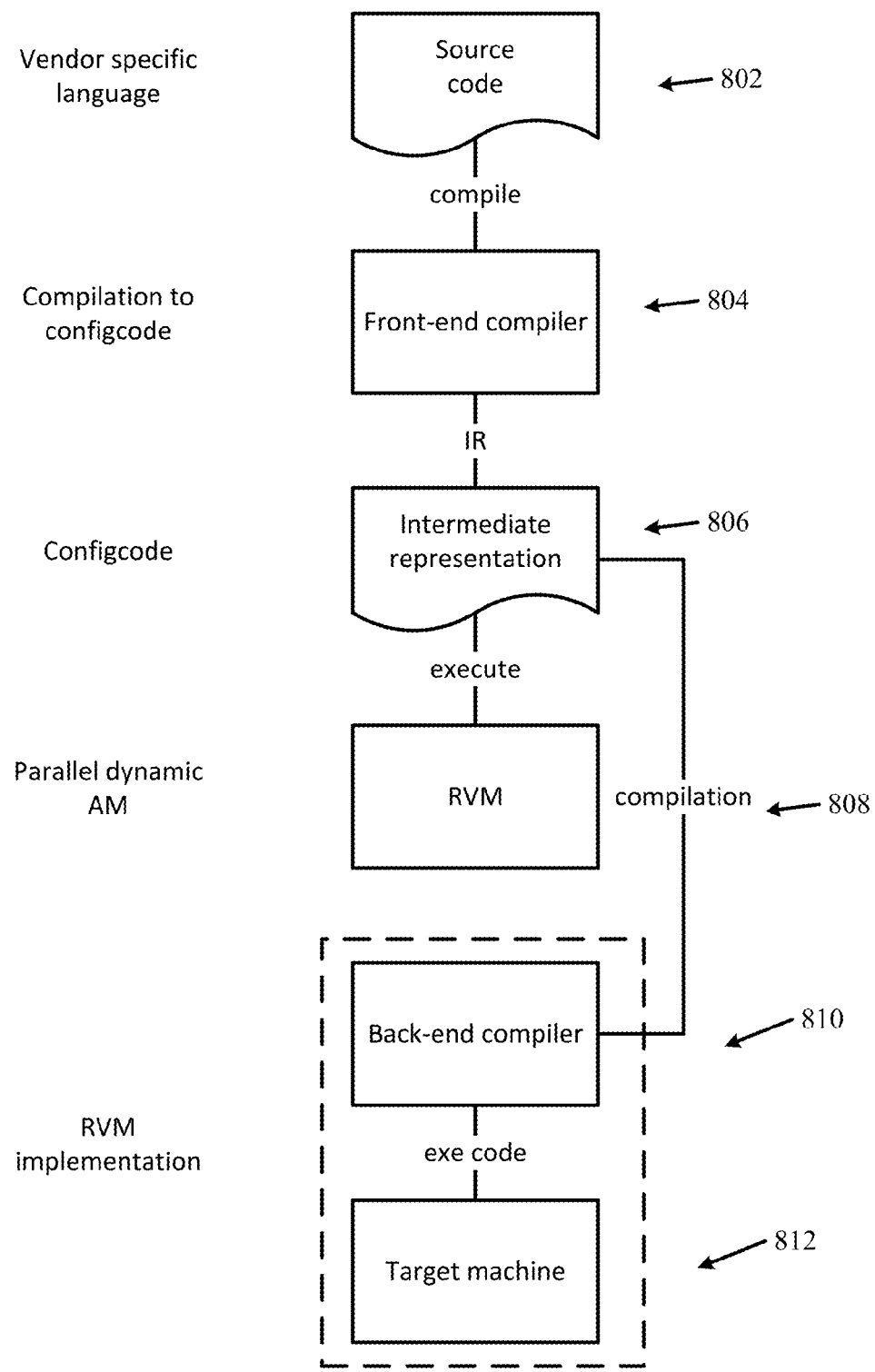
FIG. 8 is a schematic illustration of a flow chart of processing code to configure a radio transceiver, in accordance with some demonstrative embodiments.

Reference is made to FIG. 8, which schematically illustrates a flow chart of processing code to configure a radio transceiver, in accordance with some demonstrative embodiments. For example, the code may perform the functionality of radio application 157 (FIG. 1).

As indicated at block 802, the radio application may include source code to be compiled by a front-end compiler (804) to generate a configcode (806). For example, FE compiler 352 (FIG. 3) may compile the source code 361 (FIG. 3) into configcode 363 (FIG. 3).

As indicated at block 808, the configcode may be configured to be executed by an RVM, e.g., RVM 120 (FIG. 1).

As indicated at block 810, upon execution of the configcode by the RVM, a backend compiler may generate an exe code to be executed on a target machine. For example, upon execution of RVM 120 (FIG. 1), BE compiler 125 (FIG. 1) may generate the exe code based on second code 129 generated by RVM 120 (FIG. 1). The exe code may be executed on radio 114 (FIG. 1) to configure radio 114 (FIG. 1)

Figure 9:
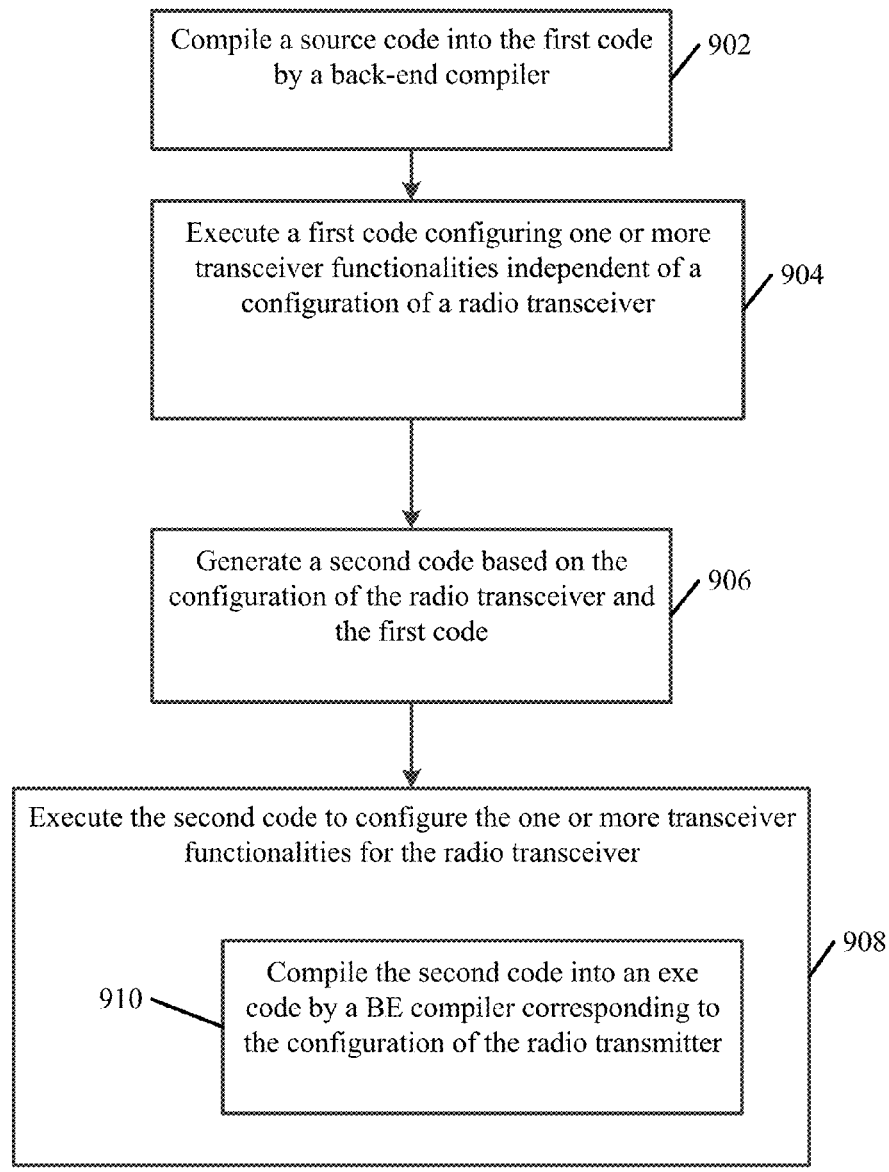
FIG. 9 is a schematic illustration of a method of configuring a radio transceiver, in accordance with some demonstrative embodiments.

Reference is made to FIG. 9, which schematically illustrates a method of configuring a radio transceiver, in accordance with some demonstrative embodiments. In some demonstrative embodiments, one or more of the operations of the method of FIG. 4 may be performed by any suitable wireless communication system, e.g., system 100 (FIG. 1), system 300 (FIG. 3) and/or system 500 (FIG. 5); an RVM, e.g., RVM 120 (FIG. 1) and/or RVM 320 (FIG. 3); a VRRS, e.g., VRRS 570 (FIG. 5) and/or a radio processor, e.g., RP 122 (FIG. 1), RP 322 (FIG. 3) and/or RP 522 (FIG. 5).

As indicated at block 904, the method may include executing a first code configuring one or more transceiver functionalities independent of a configuration of a radio transceiver. For example, RVM 120 (FIG. 1) may execute first code 159 (FIG. 1) configuring one or more transceiver functionalities independent of a configuration of radio transceiver 114 (FIG. 1), e.g., as described above.

As indicated at block 906, the method may include generating a second code based on the configuration of the radio transceiver and the first code. For example, RVM 120 (FIG. 1) may generate second code 129 (FIG. 1) based on the configuration of radio transceiver 114 (FIG. 1) and first code 159 (FIG. 1), e.g., as described above.

As indicated at block 908, the method may include executing the second code to configure the one or more transceiver functionalities for the radio transceiver. For example, RP 122 (FIG. 1) 120 may execute second code 129 (FIG. 1) to configure the one or more transceiver functionalities of radio transceiver 114 (FIG. 1), e.g., as described above.

As indicated at block 910, executing the second code may include compiling the second code into an exe code by a BE compiler corresponding to the configuration of the radio transmitter. For example, BE compiler 125 (FIG. 1) may compile second code 129 (FIG. 1) into the exe code, e.g., as described above.

Figure 10:
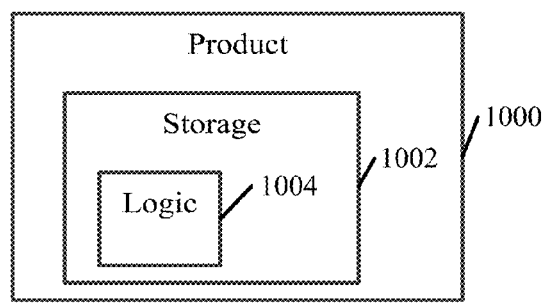
FIG. 10 is a schematic illustration of a product of manufacture, in accordance with some demonstrative embodiments.

As indicated at block 902, the method may include compiling a source code into the first code by a back-end compiler. For example, BE-compiler 125 (FIG. 1) may compile the source code of radio application 157 (FIG. 1) into first code 159 (FIG. 1), e.g., as described above Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of device 102 (FIG. 1), RVM 120 (FIG. 1), RVM 320 (FIG. 3), VRRS 570 (FIG. 5), RP 122 (FIG. 1), RP 322 (FIG. 3), RP 522 (FIG. 5) and/or to perform one or more operations of the method of FIGS. 4, 6 and/or 8. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a radio virtual machine (RVM) to configure a radio transceiver, the RVM comprising a radio processor to execute a first code configuring one or more transceiver functionalities independent of a configuration of the radio transceiver, and to generate a second code based on the configuration of the radio transceiver and the first code, wherein the second code is to be executed by the radio transceiver to configure the one or more transceiver functionalities for the radio transceiver.

Example 2 includes the subject matter of Example 1 and optionally, wherein the RVM is to download the first code from a radio application store.

Example 3 includes the subject matter of Example 1 or 2 and optionally, wherein the RVM is to be embedded by the radio transceiver.

Example 4 includes the subject matter of any one of Examples 1-3 and optionally, wherein the RVM is to authenticate the first code with a certification entity.

Example 5 includes the subject matter of any one of Examples 1-4 and optionally, wherein the RVM is to access one or more radio resources of the radio transceiver based on a certificate from a certification entity.

Example 6 includes the subject matter of any one of Examples 1-5 and optionally, wherein the RVM includes one or more generic resources to control radio transceivers having a plurality of different transceiver configurations, and wherein the RVM is to generate the second code using the generic resources Example 7 includes the subject matter of Example 6 and optionally, wherein the one or more generic resources include one or more resources selected from the group consisting of a radio library, processing elements, and data objects.

Example 8 includes the subject matter of any one of Examples 1-7 and optionally, wherein the first code includes code generated by a front-end compiler.

Example 9 includes the subject matter of any one of Examples 1-8 and optionally, wherein the second code is to be compiled by a back-end compiler corresponding to the configuration of the radio transceiver.

Example 10 includes a wireless communication device comprising a radio transceiver; and a radio virtual machine (RVM) to configure the radio transceiver, the RVM comprising a radio processor to execute a first code configuring one or more transceiver functionalities independent of a configuration of the radio transceiver, and to generate a second code based on the configuration of the radio transceiver and the first code, wherein the second code is to be executed by the radio transceiver to configure the one or more transceiver functionalities for the radio transceiver.

Example 11 includes the subject matter of Example 10 and optionally, comprising a storage to store the first code, wherein the RVM is to download the first code from a radio application store and to store the first code in the storage.

Example 12 includes the subject matter of Example 10 or 11 and optionally, comprising a storage to store a plurality of configuration code elements defining a plurality of different transceiver configuration schemes, wherein a transceiver configuration code element includes the first code to configure one or more transceiver functionalities according to a transceiver configuration scheme.

Example 13 includes the subject matter of any one of Examples 10-12 and optionally, wherein the RVM is to authenticate the first code with a certification entity.

Example 14 includes the subject matter of any one of Examples 10-13 and optionally, wherein the RVM is to access one or more radio resources of the radio transceiver based on a certificate from a certification entity.

Example 15 includes the subject matter of any one of Examples 10-14 and optionally, wherein the RVM includes one or more generic resources to control radio transceivers having a plurality of different transceiver configurations.

Example 16 includes the subject matter of Example 15 and optionally, wherein the one or more resources include one or more resources selected from the group consisting of a radio library, processing elements, and data objects.

Example 17 includes the subject matter of any one of Examples 10-16 and optionally, wherein the first code includes a code generated by a front-end compiler.

Example 18 includes the subject matter of any one of Examples 10-17 and optionally, comprising a back-end compiler to compile the second code according to the configuration of the radio transceiver.

Example 19 includes a method comprising executing a first code configuring one or more transceiver functionalities independent of a configuration of a radio transceiver; and generating a second code based on the configuration of the radio transceiver and the first code, wherein the second code is to be executed by the radio transceiver to configure the one or more transceiver functionalities for the radio transceiver.

Example 20 includes the subject matter of Example 19 and optionally, comprising downloading the first code from a radio application store.

Example 21 includes the subject matter of Example 19 or 20 and optionally, comprising storing a plurality of configuration code elements defining a plurality of different transceiver configuration schemes, wherein a transceiver configuration code element includes the first code to configure one or more transceiver functionalities according to a transceiver configuration scheme.

Example 22 includes the subject matter of any one of Examples 19-21 and optionally, comprising authenticating the first code with a certification entity.

Example 23 includes the subject matter of any one of Examples 19-22 and optionally, comprising accessing one or more radio resources of the radio transceiver based on a certificate from a certification entity.

Example 24 includes the subject matter of any one of Examples 19-23 and optionally, comprising using one or more generic resources configured to control radio transceivers having a plurality of different transceiver configurations.

Example 25 includes the subject matter of Example 24 and optionally, wherein the one or more generic resources include one or more resources selected from the group consisting of a radio library, processing elements, and data objects.

Example 26 includes the subject matter of any one of Examples 19-25 and optionally, wherein the first code includes a code generated by a front-end compiler.

Example 27 includes the subject matter of any one of Examples 19-26 and optionally, comprising compiling the second code according to the configuration of the radio transceiver.

Example 28 includes a product including a non-transitory storage medium having stored thereon instructions that, when executed by a machine, result in executing a first code configuring one or more transceiver functionalities independent of a configuration of a radio transceiver; and generating a second code based on the configuration of the radio transceiver and the first code, wherein the second code is to be executed by the radio transceiver to configure the one or more transceiver functionalities for the radio transceiver.

Example 29 includes the subject matter of Example 28 and optionally, wherein the instructions result in downloading the first code from a radio application store.

Example 30 includes the subject matter of Example 28 or 29 and optionally, wherein the instructions result in storing a plurality of configuration code elements defining a plurality of different transceiver configuration schemes, wherein a transceiver configuration code element includes the first code to configure one or more transceiver functionalities according to a transceiver configuration scheme.

Example 31 includes the subject matter of any one of Examples 28-30 and optionally, wherein the instructions result in authenticating the first code with a certification entity.

Example 32 includes the subject matter of any one of Examples 28-31 and optionally, wherein the instructions result in accessing one or more radio resources of the radio transceiver based on a certificate from a certification entity.

Example 33 includes the subject matter of any one of Examples 28-32 and optionally, wherein the instructions result in using one or more generic resources configured to control radio transceivers having a plurality of different transceiver configurations.

Example 34 includes the subject matter of Example 33 and optionally, wherein the one or more generic resources include one or more resources selected from the group consisting of a radio library, processing elements, and data objects.

Example 35 includes the subject matter of any one of Examples 28-34 and optionally, wherein the first code includes a code generated by a front-end compiler.

Example 36 includes the subject matter of Example any one of claims 28-35 and optionally, wherein the instructions result in compiling the second code according to the configuration of the radio transceiver.

Example 37 includes an apparatus comprising means for executing a first code configuring one or more transceiver functionalities independent of a configuration of a radio transceiver; and means for generating a second code based on the configuration of the radio transceiver and the first code, wherein the second code is to be executed by the radio transceiver to configure the one or more transceiver functionalities for the radio transceiver.

Example 38 includes the subject matter of Example 37 and optionally, comprising means for downloading the first code from a radio application store.

Example 39 includes the subject matter of Example 37 or 38 and optionally, comprising means for storing a plurality of configuration code elements defining a plurality of different transceiver configuration schemes, wherein a transceiver configuration code element includes the first code to configure one or more transceiver functionalities according to a transceiver configuration scheme.

Example 40 includes the subject matter of any one of Examples 37-39 and optionally, comprising means for authenticating the first code with a certification entity.

Example 41 includes the subject matter of any one of Examples 37-40 and optionally, comprising means for accessing one or more radio resources of the radio transceiver based on a certificate from a certification entity.

Example 42 includes the subject matter of any one of Examples 37-41 and optionally, comprising means for using one or more generic resources configured to control radio transceivers having a plurality of different transceiver configurations.

Example 43 includes the subject matter of Example 42 and optionally, wherein the one or more resources include one or more resources selected from the group consisting of a radio library, processing elements, and data objects.

Example 44 includes the subject matter of any one of Examples 37-43 and optionally, wherein the first code includes a code generated by a front-end compiler.

Example 45 includes the subject matter of any one of Examples 37-44 and optionally, comprising means for compiling the second code according to the configuration of the radio transceiver.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A radio virtual machine (RVM) to configure a radio transceiver, said RVM comprising:
one or more generic resources to control radio transceivers of a plurality of different transceiver configurations, the one or more generic resources comprising one or more operational elements to perform radio signal processing and one or more processing elements to execute the operational elements; and
a radio processor to execute a first code configuring one or more transceiver functionalities independent of a configuration of said radio transceiver, to generate a second code based on said configuration of said radio transceiver and said first code, to compile said second code into an execution (exe) code based on said configuration of said radio transceiver, and to execute said exe code by said radio transceiver to configure said one or more transceiver functionalities for said radio transceiver, said radio processor is to generate the second code by executing the first code using the one or more generic resources,
wherein the RVM is to authenticate said first code with a certification entity prior to generating said second code, to self-certify said exe code subsequent to compiling of the second code and to access one or more radio resources of said radio transceiver based on a certificate from the certification entity.

2. The RVM of claim 1, wherein said RVM is to download said first code from a radio application store.

3. The RVM of claim 1, wherein said RVM is to be embedded by said radio transceiver.

4. The RVM of claim 1, wherein said operational elements comprise one or more Fast Fourier Transform (FFT) operational elements, and the processing elements comprise at least an FFT processing element to process an FFT operation by executing the one or more FFT operational elements.

5. The RVM of claim 1, wherein said one or more generic resources include one or more data objects.

6. The RVM of claim 1, wherein said first code includes code generated by a front-end compiler.

7. The RVM of claim 1, wherein said second code is to be compiled by a back-end compiler corresponding to the configuration of said radio transceiver.

8. A wireless communication device comprising:
a radio transceiver; and
a radio virtual machine (RVM) to configure said radio transceiver, said RVM comprising:
one or more generic resources to control radio transceivers of a plurality of different transceiver configurations, the one or more generic resources comprising one or more operational elements to perform radio signal processing and one or more processing elements to execute the operational elements; and
a radio processor to execute a first code configuring one or more transceiver functionalities independent of a configuration of said radio transceiver, to generate a second code based on said configuration of said radio transceiver and said first code, to compile said second code into an execution (exe) code based on said configuration of said radio transceiver, and to execute said exe code by said radio transceiver to configure said one or more transceiver functionalities for said radio transceiver, said radio processor is to generate the second code by executing the first code using the one or more generic resources,
wherein the RVM is to authenticate said first code with a certification entity prior to generating said second code, to self-certify said exe code subsequent to compiling of the second code, and to access one or more radio resources of said radio transceiver based on a certificate from the certification entity.

9. The wireless communication device of claim 8 comprising a storage to store said first code, wherein said RVM is to download said first code from a radio application store and to store said first code in said storage.

10. The wireless communication device of claim 8 comprising a storage to store a plurality of configuration code elements defining a plurality of different transceiver configuration schemes, wherein a transceiver configuration code element includes said first code to configure one or more transceiver functionalities according to a transceiver configuration scheme.

11. The wireless communication device of claim 8, wherein said RVM is to be embedded by said radio transceiver.

12. The wireless communication device of claim 8, wherein said operational elements comprise one or more Fast Fourier Transform (FFT) operational elements, and the processing elements comprise at least an FFT processing element to process an FFT operation by executing the one or more FFT operational elements.

13. The wireless communication device of claim 8, wherein said first code includes a code generated by a front-end compiler.

14. The wireless communication device of claim 8 comprising a back-end compiler to compile said second code according to the configuration of said radio transceiver.

15. A method comprising:
authenticating with a certification entity a first code configuring one or more transceiver functionalities independent of a configuration of a radio transceiver;
subsequent to authenticating said first code, generating a second code based on said configuration of said radio transceiver and said first code, wherein generating the second code comprises generating the second code by executing the first code using one or more generic resources, the one or more generic resources configured to control radio transceivers of a plurality of different transceiver configurations, the one or more generic resources comprising one or more operational elements to perform radio signal processing and one or more processing elements to execute the operational elements;
compiling said second code into an execution (exe) code based on said configuration of said radio transceiver;
self-certifying said exe code subsequent to compiling of the second code;
executing said exe code by said radio transceiver to configure said one or more transceiver functionalities for said radio transceiver; and
accessing one or more radio resources of the radio transceiver based on a certificate from the certification entity.

16. The method of claim 15 comprising downloading said first code from a radio application store.

17. The method of claim 15, wherein said one or more generic resources include one or more data objects.

18. The method of claim 15, wherein said operational elements comprise one or more Fast Fourier Transform (FFT) operational elements, and the processing elements comprise at least an FFT processing element to process an FFT operation by executing the one or more FFT operational elements.

19. The method of claim 15, wherein said first code includes a code generated by a front-end compiler.

20. A product comprising a non-transitory storage medium having stored thereon instructions that, when executed by a machine, result in:
  authenticating with a certification entity a first code configuring one or more transceiver functionalities independent of a configuration of a radio transceiver;
  subsequent to authenticating said first code, generating a second code based on said configuration of said radio transceiver and said first code, wherein generating the second code comprises generating the second code by executing the first code using one or more generic resources, the one or more generic resources configured to control radio transceivers of a plurality of different transceiver configurations, the one or more generic resources comprising one or more operational elements to perform radio signal processing and one or more processing elements to execute the operational elements;
  compiling said second code into an execution (exe) code based on said configuration of said radio transceiver;
  self-certifying said exe code subsequent to compiling of the second code;
  executing said exe code by said radio transceiver to configure said one or more transceiver functionalities for said radio transceiver; and
  accessing one or more radio resources of the radio transceiver based on a certificate from the certification entity.

21. The product of claim 20, wherein said instructions result in downloading said first code from a radio application store.

22. The product of claim 20, wherein said instructions result in storing a plurality of configuration code elements defining a plurality of different transceiver configuration schemes, wherein a transceiver configuration code element includes said first code to configure one or more transceiver functionalities according to a transceiver configuration scheme.

23. The product of claim 20, wherein said one or more generic resources include one or more data objects.

24. The product of claim 20, wherein said second code is to be compiled by a back-end complier corresponding to the configuration of said radio transceiver.

25. The product of claim 20, wherein said operational elements comprise one or more Fast Fourier Transform (FFT) operational elements, and the processing elements comprise at least an FFT processing element to process an FFT operation by executing the one or more FFT operational elements.

26. The product of claim 20, wherein said first code includes a code generated by a front-end compiler.

* * * * *